(12) United States Patent
Ezra

(10) Patent No.: US 10,160,498 B1
(45) Date of Patent: Dec. 25, 2018

(54) TOWABLE FRAMEWORK BUILT TO ACCEPT A GOLF CART REAR SEAT KIT

(71) Applicant: Ted D Titus, Fort Myers Beach, FL (US)

(72) Inventor: Leslie P Ezra, Winamac, IN (US)

( * ) Notice: Subject to any disclaimer, the term of this patent is extended or adjusted under 35 U.S.C. 154(b) by 0 days.

(21) Appl. No.: 14/947,935

(22) Filed: Nov. 20, 2015

(51) Int. Cl.
  *B62D 21/20* (2006.01)
  *B60N 2/24* (2006.01)
  *B60D 1/07* (2006.01)
  *B62D 63/06* (2006.01)

(52) U.S. Cl.
  CPC ............. *B62D 21/20* (2013.01); *B60D 1/07* (2013.01); *B60N 2/24* (2013.01); *B62D 63/067* (2013.01); *B60Y 2200/23* (2013.01)

(58) Field of Classification Search
  CPC ......... B62D 21/20; B62D 63/067; B60D 1/07
  See application file for complete search history.

(56) References Cited

U.S. PATENT DOCUMENTS

| | | | | |
|---|---|---|---|---|
| 1,968,046 A * | 7/1934 | Linn | ...................... | B62D 63/067 122/31.1 |
| 2,564,996 A * | 8/1951 | Rasbach | ............ | B62D 53/0857 16/44 |
| 3,482,850 A * | 12/1969 | Fay | ...................... | B62D 63/067 280/641 |
| 3,874,691 A * | 4/1975 | Larsen | ...................... | B62D 7/02 280/124.103 |
| 3,877,714 A * | 4/1975 | Black | ...................... | B62D 33/02 280/638 |
| 3,917,316 A * | 11/1975 | Furnish | ................ | B62D 63/067 280/460.1 |
| 4,057,282 A * | 11/1977 | Kidd | ..................... | B62D 63/067 296/10 |
| 4,119,331 A * | 10/1978 | Jackson | .................. | B62B 5/085 280/639 |
| 4,484,759 A * | 11/1984 | Zwick | ...................... | B60D 1/56 280/416.1 |
| 4,515,394 A * | 5/1985 | Zwick | ..................... | B60B 33/02 16/35 R |
| 4,645,230 A * | 2/1987 | Hammons | ............ | B62D 63/061 16/20 |
| 5,222,753 A * | 6/1993 | Parish | .................... | B62D 61/08 211/64 |
| 5,397,148 A * | 3/1995 | Nelson | ..................... | B60D 1/07 280/416.1 |
| 5,513,868 A * | 5/1996 | Barr | ...................... | B62D 63/062 280/400 |
| 5,520,404 A * | 5/1996 | Schulte | .................. | B60D 1/173 280/460.1 |
| 6,422,641 B1 * | 7/2002 | Coryell | ............. | B62D 33/0621 224/274 |
| 6,557,882 B2 * | 5/2003 | Harrington | ............ | B60D 1/143 280/415.1 |
| 6,659,491 B2 * | 12/2003 | Green | .................. | B62D 63/065 280/423.1 |
| 7,229,090 B2 * | 6/2007 | Cumbie | .................... | B60D 1/00 280/491.3 |

* cited by examiner

*Primary Examiner* — Kevin Hurley

(57) ABSTRACT

A towable framework easily attached to the back of a golf cart to allow an additional seat to be utilized to transport additional passengers without compromising the use of the golf cart and/or golf club carrier on the rear. The towable framework can transport passengers in a forward facing position for a safer ride and a more advantageous view when riding or viewing golfers and/or other ongoing activities.

1 Claim, 4 Drawing Sheets

FIGURE 7-A
FIGURE 7-B
FIGURE 7-C
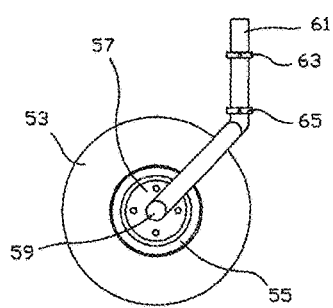
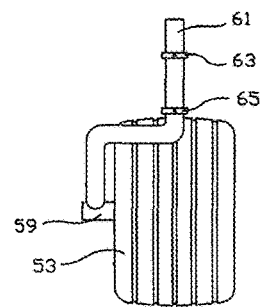
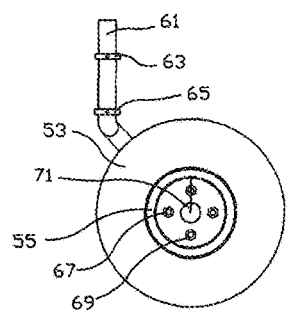
LEFT SIDE VIEW
FRONT VIEW
RIGHT SIDE VIEW

TOWABLE FRAMEWORK BUILT TO ACCEPT A GOLF CART REAR SEAT KIT

BACKGROUND

For some time companies have been building rear seat kits that can be mounted to a conventional two person golf cart. The rear golf bag holders must be removed then the additional two person seat permanently fastened to that area of the golf cart. A two person golf cart then becomes a four person golf cart.

However, the ability to haul golf club bags is forfeited. The rear seat is mounted on the back end of the golf cart facing the opposite direction of the front seats. People or children riding in the additional seat must ride backwards creating a safety issue. There is no safety rail at the rear portion of the additional seat to prevent them from falling if the golf cart accelerates quickly.

An additional seat that is mounted facing forward is more desirable.

An additional seat that does not forfeit the ability to haul golf club bags is also desirable.

An additional seat that keeps people and/or children from falling out is desirable.

An additional seat that seats 2 extra people is desirable.

An additional seat that can easily be connected or disconnected from the cart is desirable.

To accomplish the goals mentioned above, a special device is needed. The device consists of a "towable framework" that is designed to be easily attached to the back end of a golf cart. The framework is built in such a way that it allows a rear seat kit to be mounted. The rear facing seat becomes a forward facing seat when attached to the towable framework. The towable framework has one L shaped bracket welded to the end of each of two extended frame tubes. Two hitches are mounted to the golf cart frame near the rear bumper of the golf cart at the proper distance apart to connect to the towable framework's L shaped brackets. A bolt is used to connect each of the two L shaped frame brackets to each of the two golf cart frame hitches. When the two golf cart hitches are bolted to the L shaped brackets a hinge point is created that allows the towable framework to pivot up and down when riding on an uneven surface.

A trailing wheel is mounted to the rear of the towable framework. As the golf cart moves, the trailing wheel must be able to change direction when the front wheels of the golf cart change direction. The trailing wheel swivels on a vertical axis allowing a change in direction as needed.

The swivel wheel carries most of the weight of the seated passengers and a portion of the frame weight. The towable framework is built with enough internal room to allow the swivel wheel to rotate 360 degrees around the vertical axis.

The entire towable framework, with the seat kit attached, may be disconnected from the golf cart by removing one bolt from each of the two hitches. The front of the framework may be lowered to the floor while the back end sits on the rear swivel wheel. The golf cart is then free to drive away and function as it did before the towable framework was attached.

REFERENCES CITED

| U.S. patent Documents | | | |
|---|---|---|---|
| 6,883,824 | April 2005 | Yang | 280/646 |
| 4,403,806 | September 1983 | Stephens | 297/217.1 |
| 4,262,928 | April 1981 | Leitzel | 280/645 |
| 4,119,331 | October 1978 | Jackson | 280/639 |

| U.S. patent Documents | | | |
|---|---|---|---|
| 6,422,641 | July 2002 | Coryell | 296/182.1 |
| 6,183,029 | February 2001 | Deaton | 296/37.1 |
| 6,139,032 | October 2000 | Hartman | 280/32.7 |
| 4,533,013 | August 1985 | Hightower | 180/210 |
| 4,431,205 | February 1984 | Speicher | 280/282 |

BRIEF DESCRIPTION OF THE DRAWINGS

FIG. 7A is the left side view of the swivel wheel assembly;

FIG. 7B is the front view of the swivel wheel assembly;

FIG. 7C is the right side view of the swivel wheel assembly.

DETAILED DESCRIPTION OF THE DRAWINGS

Figure 1:
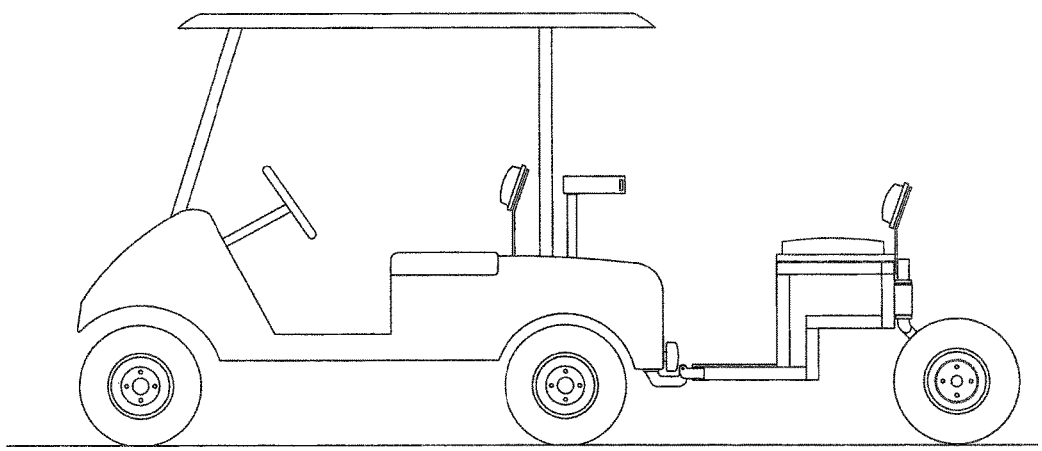
FIG. 1 is a typical golf cart with the towable framework attached to the rear of the golf cart with seat, backrest and floorboard attached.

FIG. 1 shows a typical golf cart with a golf bag bracket mounted in the rear area. A towable framework, with a rear seat kit attached, is connected to a pair of hitches that are located near the rear bumper of the golf cart.

The towable framework has a rear swivel wheel that is capable of revolving 360 degrees around a vertical axis.

Figure 2:
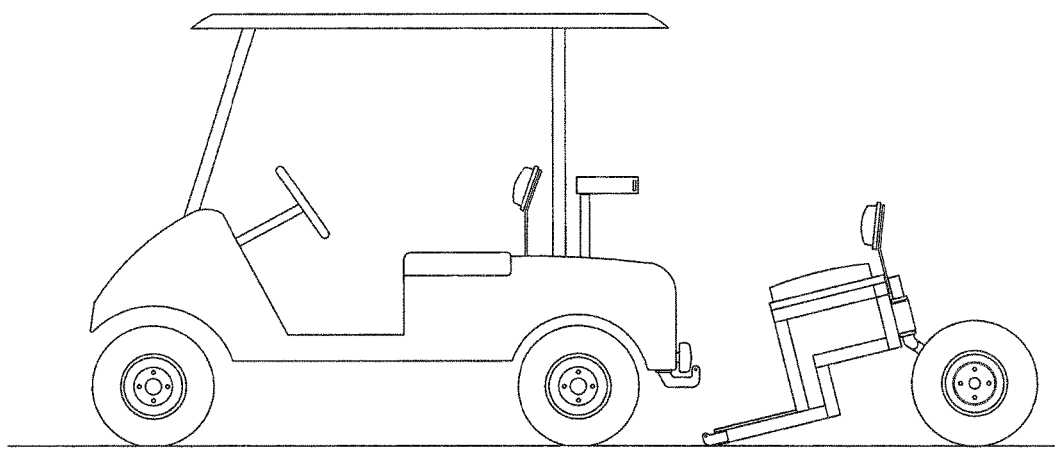
FIG. 2 is the towable framework unattached to the golf cart.

FIG. 2 shows a towable framework as it sits when unhooked from the golf cart. FIG. 2 also shows the golf cart is free to function as it did before the towable framework was connected.

Figure 3:
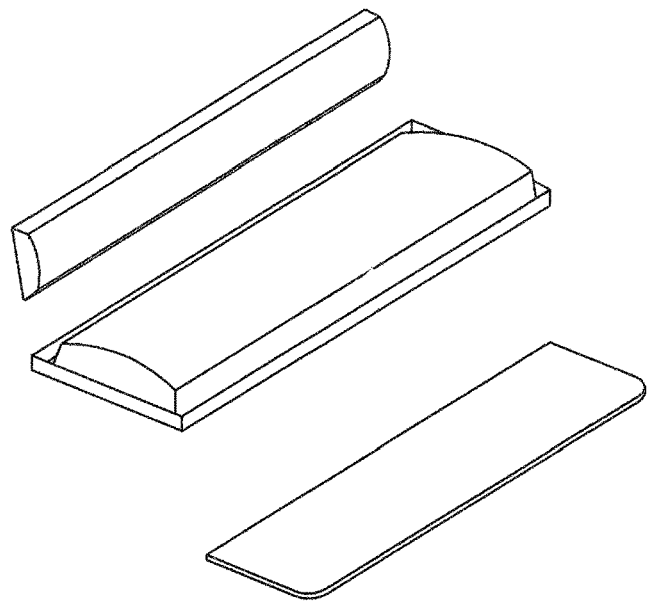
FIG. 3 is the seat, backrest and floorboard shown separately.
Figure 4:
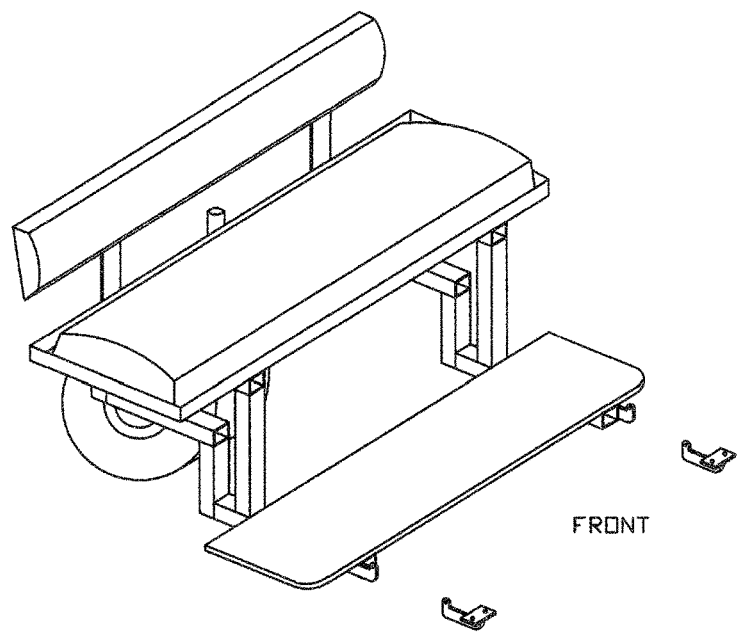
FIG. 4 is the seat, backrest and floorboard attached to towable framework.

FIGS. 3 and 4 show a golf cart rear seat kit before installation and after installed to a towable framework. The rear seat kit may be purchased from one of many golf cart dealers. The rear seat kit for two adults includes a rear bottom seat mounted on a steel frame with a rear seat backrest and a steel floorboard. The rear seat, the backrest and the floorboard are about one foot wider than the towable framework. The rear seat kits are available with seat and back rest upholstery colors that match the golf cart's front seats.

Figure 5:
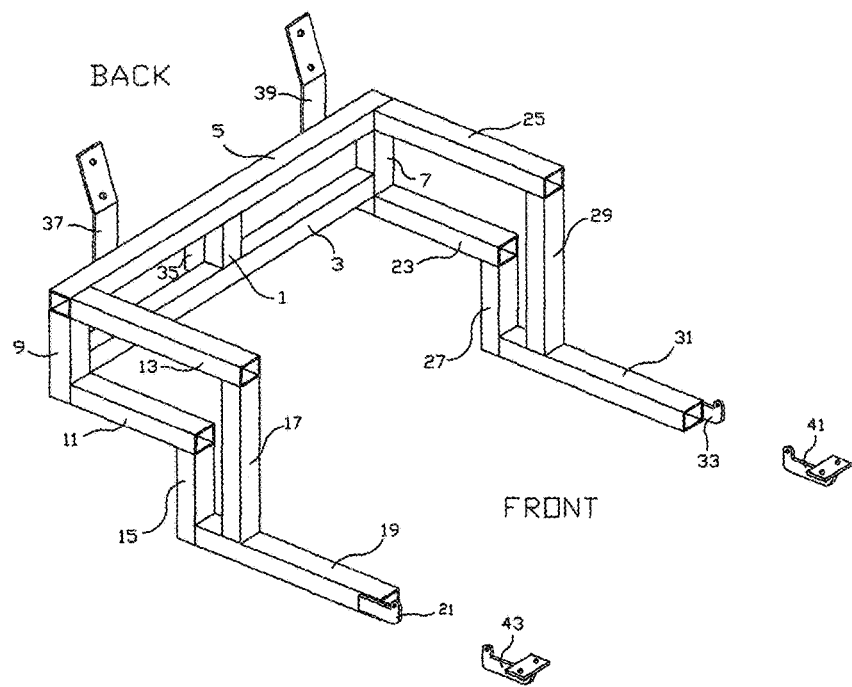
FIG. 5 is the front view of the towable framework with each item numbered.

FIG. 5 shows a 3 D view of the front of the frame. The frame is made with pieces of square steel tubing welded together to form a strong substructure to fasten the seat and floorboard. Item number 1 is a vertical square steel tube welded between item number 3 and item number 5 at the midpoint of item number 3. Item number 3 is a horizontal square steel tube welded to the side of the lower portion of item number 7 in one corner and the lower portion of item number 9 in the opposite corner. Item number 5 is a horizontal square steel tube welded on top of item number 7 in one corner and on top of item number 9 in the opposite corner. Item number 7 is a vertical square steel tube that is welded in the corner to the bottom of one end of item number 5 and is welded to the end of item number 3 and welded to the back end of item number 23. Item number 9 is a vertical square steel tube that is welded in the corner to the bottom of one end of item number 5 and is welded to the end of item number 3 and is welded to the back end of item number 11. Item number 11 is a horizontal square steel tube with one end welded to the front side of the bottom of item number 9 and the bottom of the other end welded to the top of Item number 15. Number 13 is a horizontal square steel tube with one end welded on the front side of the end of item number 5 and the other end welded to the top of item number 17. Item number 15 is a vertical square steel tube welded to the bottom side of the front end of item number 11 and welded to the back end of item number 19. Item number 17 is a vertical square steel tube welded to the bottom side of the front end of item number 13 and welded to the top of item number 19 near the back end. Item number 19 is a horizontal square steel tube welded to the front side of the bottom of item number 15 and welded to the bottom end of item number 17. Item number 21 is an L shaped vertical steel bracket, that is welded to the outside of the front end of item number 19 and includes an aperture in the top front portion that allows a bolt to pass through and connect to the rear end of a golf cart hitch. Item number 43 is a golf cart hitch that consists of a flat horizontal rectangle shaped steel plate, with two bolt holes, welded to the top of the front portion of a vertical shaped steel plate. The vertical shaped steel plate has an aperture in the top rear portion that allows a bolt to pass through and connect to the towable framework L shaped bracket, item number 21. Item number 43 bolts to the rear end of a golf cart chassis through the two bolt holes in the rectangle shaped plate.

Item number 37 is welded to the back side of item number 5 and consists of a steel bar with a slight bend in the upper portion. Item number 37 is welded to the back side of item number 5 at proper a distance with two bolt holes above the bend that allow bolts to pass through and fasten to the back side of the rear seat kit backrest.

Figure 6:
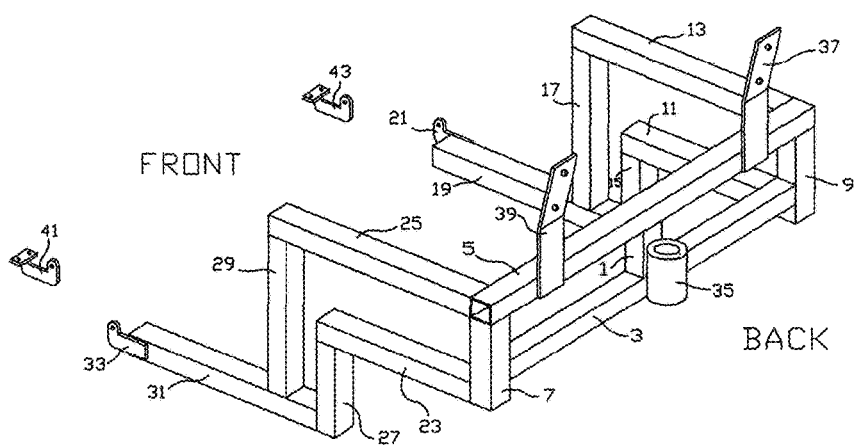
FIG. 6 is the back view of the towable framework with each item numbered.

Item numbers 23, 25, 27, 29, 31, 33, 39 and 41 are identical to item numbers 11, 13, 15, 17, 19, 21, 37 and 43 respectively on the opposite side of the framework and are detailed in FIG. 6.

FIG. 6 shows a 3d view of the back of the frame and clearly shows the rest of the square steel tubes, the vertical steel bracket, and the round steel tube. Item number 23 is a horizontal square steel tube with one end welded to the front side of the bottom of item number 7 and the other end welded to the top of item number 27. Item number 25 is a horizontal square steel tube with one end welded to the front side of the end of item number 5 and one end welded to the top of item number 29. Item number 27 is a vertical square steel tube welded to the bottom side of the front end of item number 23 and welded to the back end of item number 31. Item number 29 is a vertical square steel tube welded to the bottom side of the front end of item number 25 and welded to the top of item number 31 near the back end. Item number 31 is a horizontal square steel tube welded to the front side of the bottom of item number 27 and welded to the bottom end of item number 29. Item number 33 is an L shaped vertical steel bracket that is welded to the outside of the front end of item number 31 and includes an aperture in the top front portion that allows a bolt to pass through and connect to the rear end of a golf cart hitch. Item number 41 is a golf cart hitch that consists of a flat horizontal rectangle shaped steel plate, with 2 bolt holes, welded to the top of the front portion of a vertical shaped steel plate. The vertical shaped steel plate has an aperture in the top rear portion that allows a bolt to pass through and connect to the towable framework L shaped hitch, item number 33. Item number 41 bolts on to the rear end of a golf cart chassis through the two bolt holes on the rectangle shaped steel plate. Item number 35 is a round steel tube with a thick wall. It is welded directly to the back side of item number 1 and item number 3. It has an inside dimension sized to accept the vertical swivel axle that is shown in FIG. 7 as item number 61. Item number 39 is welded to the back side of item number 5 and consists of a steel bar with a slight bend in the upper portion. Item number 39 is welded to the back side of item number 5 at a proper distance with two bolt holes above the bend that allows bolts to pass through and fasten to the back side of the rear seat kit backrest.

FIG. 7A is a left side view, FIG. 7B is a front side view, and 7C is a right side view of the swivel wheel assembly. Item number 53 is the tire. Item number 59 is the wheel axle. Item number 61 is the vertical swivel axle. Item number 61 is made from a solid steel bar that is bent 90 degrees to one side of the tire just below the upper vertical portion. It is also bent 90 degrees at a point where it clears the side of the tire with a compound bend that directs the bottom end of the bar 40 degrees from vertical where it is welded to the horizontal wheel axle, item number 59. Items number 63 and 65 are steel lock collars with set screws. The steel lock collars can be moved up or down the vertical swivel axle, number 61. Item number 65 locks in position, on item number 61, just below the round steel tube, item number 35 of FIG. 6, to determine the overall height of the towable framework. Item number 63 locks in position, on item number 61 directly above the round steel tube, item number 35 of FIG. 6, to prevent the wheel assembly from dropping out of item number 35 of FIG. 6.

FIG. 7A and FIG. 7C show item number 55, the wheel, item number 67, the lug bolts, item number 69, the lug bolt nuts and item number 71, the hub cover. FIG. 7A shows how the lower portion of the vertical swivel axle, number 61, angles back 40 degrees from vertical where it is welded to the wheel axle, item number 59. Item number 57 is the back side of the wheel hub. Item number 59 is an end view of the wheel axle.

The invention claimed is:
1. A towable framework designed to be attached to the back of a golf cart comprising:
   a) a floorboard and a golf cart seat attached to the towable framework;
   b) a swivel wheel attached to the towable framework;
   c) the swivel wheel supporting a large portion of the weight of the towable framework;
   d) the swivel wheel capable of rotating 360 degrees;
   e) two L shaped vertical steel brackets, one each welded to one end of two main frame tubes of the towable framework;
   f) two golf cart hitches bolted to the rear of a golf cart and spaced a distance apart that matches the distance apart of the two L shaped brackets welded to the two main frame tubes;
   g) two bolts, one each inserted through a hole of the L shaped vertical steel bracket welded to the main frame tube and a hole of the golf cart hitch bolted to the rear of golf cart, to provide a means to attach the towable framework to the golf cart.

* * * * *